Figure 1:
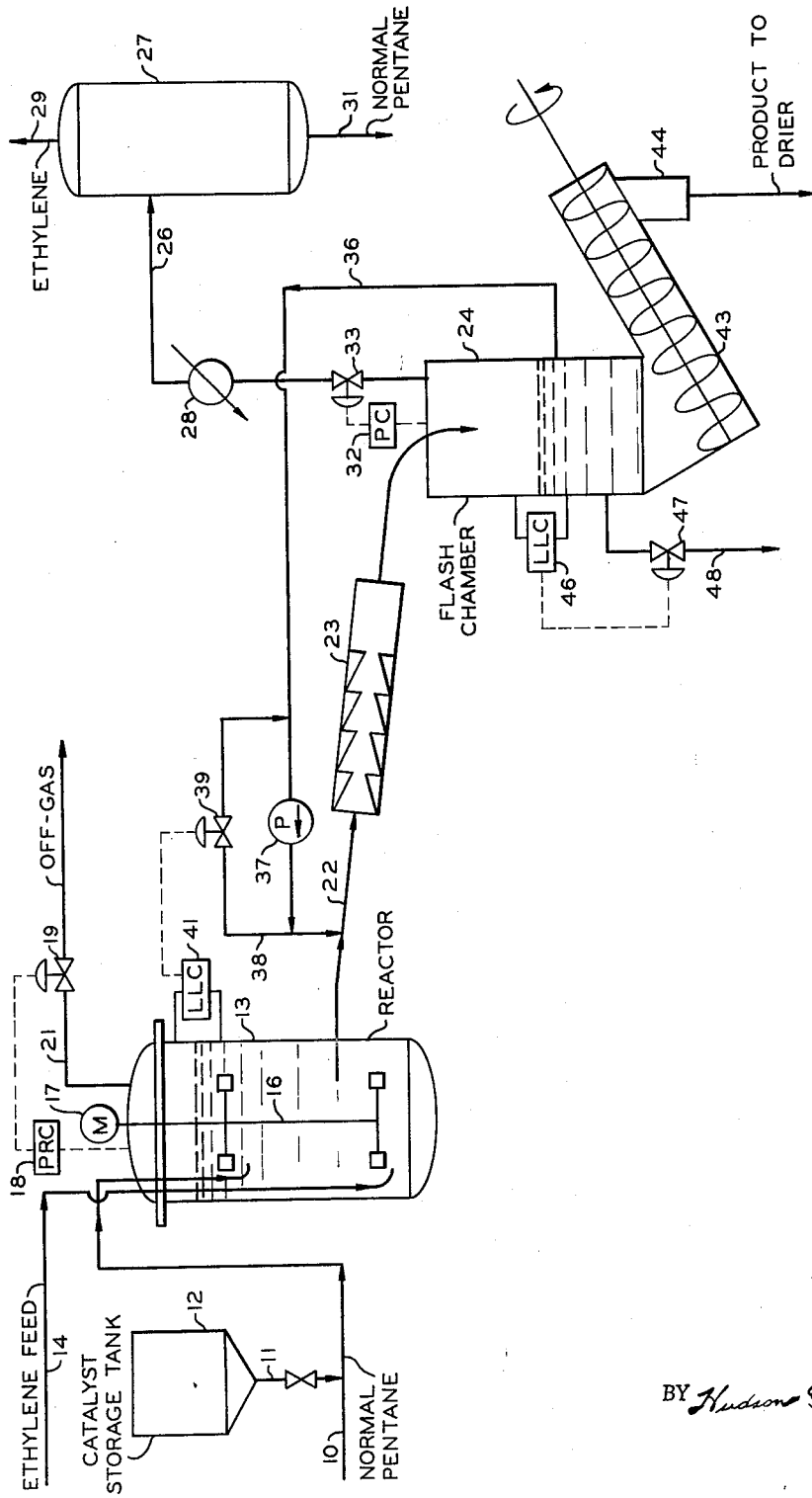

Sept. 26, 1961 N. F. McLEOD 3,001,978
PROCESS AND APPARATUS FOR REMOVAL OF REACTANT MATERIAL
FROM A POLYMERIZATION PRESSURE VESSEL
Filed Oct. 13, 1958 2 Sheets-Sheet 1

INVENTOR.
N. F. McLEOD

BY Hudson and Young

ATTORNEYS

United States Patent Office 3,001,978
Patented Sept. 26, 1961

3,001,978
PROCESS AND APPARATUS FOR REMOVAL OF REACTANT MATERIAL FROM A POLYMERIZATION PRESSURE VESSEL
Norman F. McLeod, Borger, Tex., assignor to Phillips Petroleum Company, a corporation of Delaware
Filed Oct. 13, 1958, Ser. No. 766,822
16 Claims. (Cl. 260—94.9)

This invention relates to the removal of liquid materials from a pressure vessel. In one aspect, the invention relates to apparatus for effecting the removal from a reaction zone of a slurry of solids in a liquid medium. In another aspect, it relates to a method for controlling the removal of a slurry of solids in a liquid from a pressurized reaction zone.

It has recently been discovered, as disclosed in U.S. Patent 2,285,721 by J. P. Hogan and R. L. Banks, that unique polymers and copolymers can be produced by contacting one or more olefins with a catalyst comprising as an essential ingredient chromium oxide, preferably including a substantial amount of hexavalent chromium. The chromium oxide is ordinarily associated with at least one other oxide, particularly at least one oxide selected from the group consisting of silica, alumina, zirconia and thoria. The olefin feed used for the polymerization is at least one olefin selected from a class of 1-olefins having a maximum of eight carbon atoms per molecule and no branching nearer the double bond than the 4-position. Examples of olefins which can be polymerized by the described method include ethylene, propylene, 1-butene, 1-pentene, and 1,3-butadiene. Copolymers, such as ethylene-propylene copolymers, and ethylene-butadiene copolymers, can also be prepared by utilizing the chromium oxide-containing catalyst. In copending U.S. patent application Serial No. 590,567, filed by G. T. Leatherman and C. V. Detter on June 11, 1956, there is described an improvement in the process disclosed in the Hogan and Banks patent insofar as the production of ethylene polymers is concerned.

In accordance with the Leatherman and Detter process, which is described in detail in the above cited application, ethylene or mixtures of ethylene with other unsaturated hydrocarbons are contacted with a suspension of a chromium oxide-containing catalyst in a liquid hydrocarbon diluent. The contacting occurs at a temperature such that substantially all of the polymer produced is insoluble in the diluent and in solid particle form, the particles being substantially non-tacky and non-agglutinative, and suspended in the liquid diluent. The liquid hydrocarbon diluent serves as an inert dispersant and heat transfer medium in the practice of the process. While the liquid hydrocarbon is a solvent for the ethylene feed, the polymer at the temperature at which the polymerization is carried out is insoluble in the liquid hydrocarbon. Liquid hydrocarbons which can be used are those which are liquid and chemically inert under the reaction conditions. Paraffins, such as those having from 3 to 12, preferably from 3 to 8, carbon atoms per molecule, can be advantageously utilized in the practice of the invention. Examples of paraffins which can be employed include propane, n-butane, n-pentane, isopentane, n-hexane, n-decane, 2,2,4-trimethylpentane (isooctane), and the like. Another class of hydrocarbons which can be used are naphthenic hydrocarbons having from 4 to 6 carbon atoms in a naphthenic ring and which can be maintained in the liquid phase under the polymerization conditions. Examples of such naphthenic hydrocarbons are cyclohexane, cyclopentane, methylcyclopentane, methylcyclohexane, ethylcyclohexane, the methyl ethyl cyclopentanes, the methyl propyl cyclohexanes, and the ethyl propyl cyclohexanes. A preferred subclass of naphthenic hydrocarbons within the above-described general class is constituted by those naphthenic hydrocarbons having from 5 to 6 carbon atoms in a single ring and from 0 to 2 methyl groups as the only substituent on the ring. Thus, the preferred naphthenic hydrocarbons are cyclopentane, cyclohexane, methylcyclopentane, methylcyclohexane, the dimethylcyclopentanes, and the dimethylcyclohexanes. It is also disclosed that mixtures of paraffinic and naphthenic hydrocarbons can serve as the reaction medium.

When utilizing butane and higher paraffinic hydrocarbons as the reaction medium, the polymerization temperature of the Leatherman and Detter process is generally in the range of about 230° F. and below, preferably 225° F. and below. Propane having a critical temperature of about 206° F. is useful in the range in which it can be maintained in the liquid phase. The temperature range for naphthenic hydrocarbons is about 190° F. and below preferably about 180° F. and below. If mixtures of paraffinic and naphthenic hydrocarbons are employed, the upper temperature limit will be between 190 and 230° F., depending upon the composition of the mixture.

One modification of the Leatherman and Detter process comprises contacting ethylene in a reaction zone with a suspension of a chromium oxide-containing catalyst in a liquid hydrocarbon selected from the group consisting of paraffinic and naphthenic hydrocarbons, the contacting occurring at a temperature in the range of 150 to 230° F. when said liquid hydrocarbon is a paraffin, and at a temperature in the range of 150 to 190° F. when said liquid hydrocarbon is a naphthenic hydrocarbon; removing a mixture of liquid hydrocarbon and solid polymer from the reaction zone; and separating polymer from the mixture. More desirably, the polymerization is carried out at a temperature in the range of 150 to 225° F. when the liquid hydrocarbon is a paraffin and in the range of 150 to 180° F. in the case of cycloparaffins. One of the important advantages of the invention lies in the fact that it is unnecessary to treat the polymer to remove the catalyst. However, where desired, the polymer can be treated so as to separate catalyst from the polymer.

The catalyst used in the above-described process comprises, as an essential ingredient, chromium oxide, preferably including a substantial amount of hexavalent chromium. The chromium oxide is ordinarily associated with at least one other oxide, particularly at least one oxide selected from the group consisting of silica, alumina, zirconia and thoria. The chromium oxide content of the catalyst can range from 0.1 to 10 or more weight percent, e.g., up to about 50 percent or higher, usually 50 percent or less, but the preferred range is from 2 to 6 weight percent, expressed as elemental chromium. A preferred non-chromium component is a silica-alumina composite containing a major proportion of silica and a minor proportion of alumina. While the method of preparing the silica-alumina composite undoubtedly affects to some extent the catalyst activity, it appears that composites prepared from any of the prior art processes for preparing such catalytically active composites, e.g., coprecipitation or impregnation, are operative for the process of htis invention. Methods for the preparation and activation of this catalyst are described in detail in the Hogan and Banks patent referred to hereinbefore. One satisfactory method for producing the catalyst comprises the use of a steam-aged commercial cracking catalyst comprising a coprecipitated gel containing approximately 90 weight percent silica and 10 weight percent alumina. Such a gel is impregnated with an aqueous solution of a chromium compound ignitable to chromium oxide. Examples of such compounds are chromium trioxide, chromium nitrate, chromium acetate, and ammonium chromate. The composite resulting from the impregnation step is dried and then contacted for a period of several hours at a temperature of from 450 to 1500° F., preferably from about 900 to 1000° F., under non-reducing conditions, for example, with a stream of substantially anhydrous (dew point preferably 0° F. or lower) oxygen-containing gas such as air. A commercial micro-spheroidal silica-alumina composite can also be advantageously used in the preparation of the catalyst.

The catalyst is preferably employed in the form of a relatively fine powder so that it may be readily maintained in suspension or as a slurry in the liquid hydrocarbon. The catalyst powder generally has a particle size of 100 mesh and smaller, preferably 100 microns and smaller. While the catalyst size is not critical, it should be small enough so that it can be readily maintained as a slurry in the liquid hydrocarbon. The concentration of the catalyst in the reaction zone can vary within wide limits. However, the concentration of the catalyst in the reaction zone will generally be in the range of 0.01 to 5 weight percent, preferably 0.01 to 0.1 weight percent, based on the total amount of the reaction medium, i.e., liquid hydrocarbon diluent, present in the reaction zone. While there are no critical residence or contact times for practicing the process, the contact time will generally be in the range of 0.1 to 12 hours, preferably from 1 to 5 hours.

When practicing the Leatherman and Detter process, the pressure in the reaction zone is generally that which is sufficient to maintain the liquid hydrocarbon diluent in the liquid phase and will ordinarily range from about 100 to 700 p.s.i. For efficient, continuous operation of the process, it is necessary to provide means for the removal of the reaction mixture from the reaction zone while still maintaining a desired pressure therein. Because the reaction mixture comprises a slurry of solid polymer particles in the liquid hydrocarbon diluent, a conventional ported-type motor valve cannot be effectively used to control the withdrawal of the reaction mixture. It has been found that if such a conventional valve is used, it has only a very short valve life because of the erosive nature of the slurry of polymer particles in the reaction medium.

It is, therefore, an object of this invention to provide an improved means for removing a slurry of solids in a liquid from a pressure vessel.

Another object of the invention is to provide means for controlling the rate of withdrawal of a slurry of solids in a liquid from a pressure reactor.

Still another object of the invention is to provide a method for controlling the rate at which a slurry of solids in a liquid is withdrawn from a pressurized reaction zone.

A further object of the invention is to provide means for withdrawing a slurry of solids in a liquid from a pressurized vessel while maintaining a desired pressure within the vessel.

A still further object of the invention is to provide an improved method for conducting a polymerization process in which substantially all the polymer produced is in solid particle form suspended in a liquid reaction medium.

Other and further objects and advantages of the invention will become apparent to those skilled in the art upon consideration of the accompanying disclosure.

The present invention is directed to an improved apparatus and method whereby a slurry of solids in a liquid material is withdrawn from a pressure vessel at a desired rate while maintaining a desired pressure within the vessel. In a broad aspect, the apparatus of this invention comprises a pressure vessel having inlet and outlet conduit means attached thereto, a closed vessel connected to the other end of the outlet conduit means, at least one constriction means, such as a venturi, positioned in the outlet conduit means, a recycle conduit means connecting said enclosed vessel to said outlet conduit means at a point between the pressure vessel and the constriction means; and means responsive to one of the variables pressure and liquid level in the pressure vessel for controlling the rate of flow of material in the recycle conduit means. In another embodiment, in a process carried out at superatmospheric pressure in a closed reaction zone, the invention resides in an improvement in the method for continuously withdrawing from the reaction zone reactant materials comprising a liquid material or a slurry of solids in a liquid medium. The improvement broadly comprises the following steps: flowing the reactant material from the reaction zone through a transfer zone into a flash chamber, the material being passed through a pressure reduction zone during its flow through the transfer zone so that it is thereafter at a desired lower pressure than that maintained in the reaction zone, and recycling liquid material from the flash chamber to the transfer zone at a point upstream from the pressure reduction zone, the rate at which the liquid material is recycled being controlled in accordance with one of the variables liquid level and pressure within the reaction zone.

Figure 2:
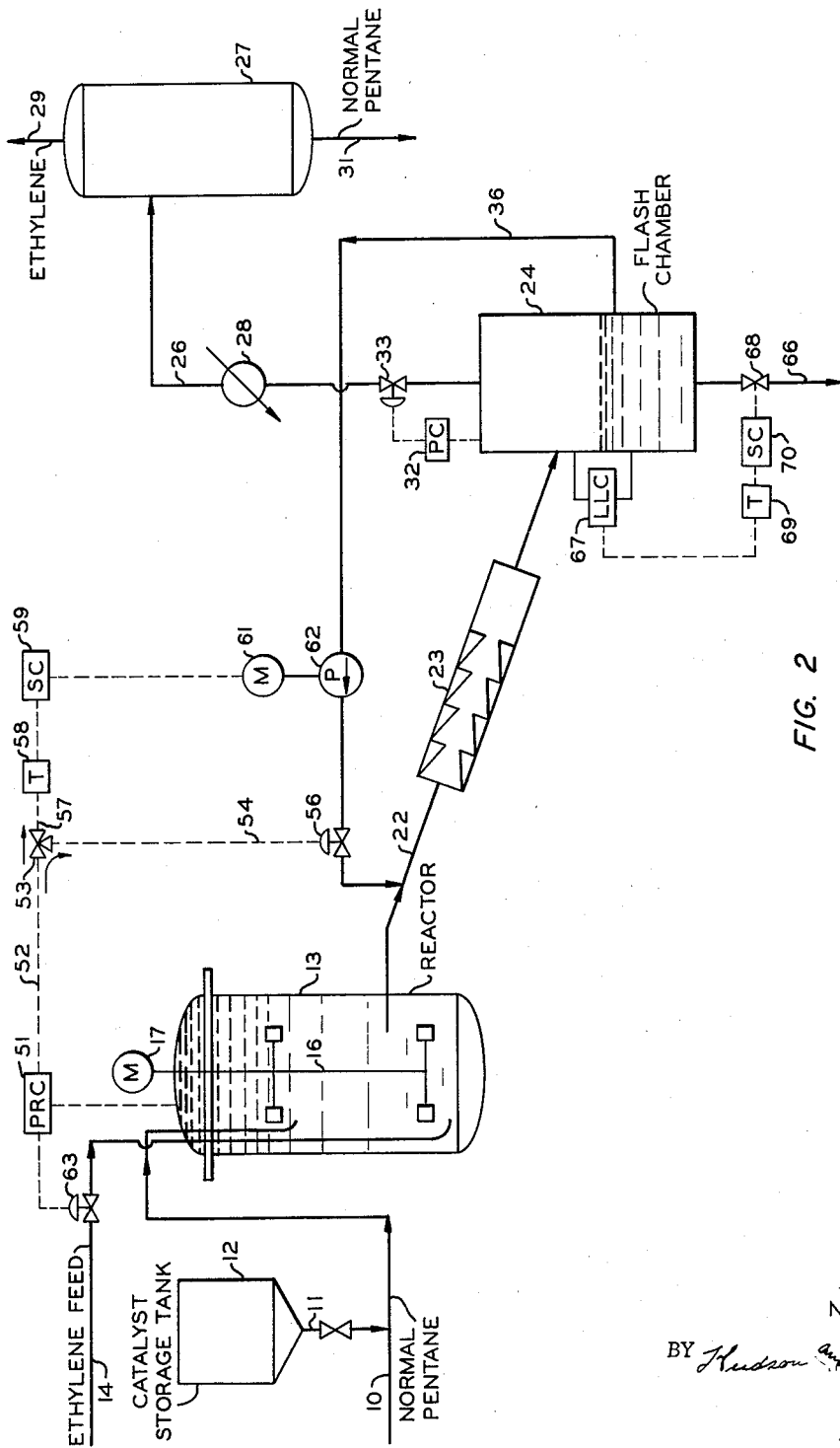

A more complete understanding of the invention can be obtained by referring to the following description and drawing, in which:

FIGURE 1 is a flow diagram illustrating a preferred embodiment of the invention; and FIGURE 2 is a flow diagram illustrating still other embodiments of the invention.

While the invention will be discussed hereinafter with relation to a polymerization process in which ethylene is polymerized in the presence of a chromium oxide-containing catalyst using normal pentane as the reaction medium or diluent, it is to be understood that it is not intended to limit the invention to a polymerization process. Although the invention is particularly applicable to such a process, it can also be advantageously used in conjunction with other processes wherein it is desired to remove a fluid material at a controlled rate from a pressurized vessel.

Referring now to the drawing, as shown in FIGURE 1, a liquid hydrocarbon, such as normal pentane, enters the system through inlet line 10. A catalyst, which preferably has a particle size of 100 mesh or smaller, is added to the liquid hydrocarbon by means of line 11 connecting catalyst storage tank 12 to line 10. The slurry of catalyst in normal pentane which is thus formed is then pumped into reactor 13. The catalyst can be, for example, a chromium oxide-silica-alumina catalyst prepared by impregnating a 90 weight percent silica and 10 weight percent alumina gel composite with chromium trioxide, drying, and heating in air to obtain a catalyst composition containing approximately 2.0 weight peercent chromium in the form of a cromium oxide of which about half is in the form of hexavalent chromium.

Ethylene on entering the system through inlet line 14 is intimately contacted with the catalyst suspension or slurry in reactor 13. It is to be understood that mixtures of ethylene with other unsaturated hydrocarbons, e.g., mixtures of ethylene with minor amounts of higher 1-olefins, such as propylene, 1-butene, 1-pentene, 1-hexene and the like, can be polymerized in accordance with this process. A suitable stirring means 16, driven by motor 17, is provided to facilitate contact and to maintain the catalyst in suspension in the reaction medium. The reaction zone is maintained at a temperature such that the polymer produced is substantially insoluble in the normal pentane and is in solid particle form. When utilizing a paraffinic hydrocarbon, such as normal pentane, this temperature is in the range of about 230° F. and below, preferably 225° F. and below. When naphthenic hydrocarbons are employed, the temperature is in the range of about 190° F. and below, preferably about 180° F. and below. While there appears to be nothing critical about the lower temperature at which the polymerization can be carried out, as a practical matter, it is desirable in the case of paraffins and cycloparaffins that the temperature not be below 150° F. The pressure in reactor 13 is such that the normal pentane is maintained substantially in the liquid phase. This pressure is generally in the range of 100 to 700 p.s.i. A pressure in the reactor within this range is maintained by means of pressure recorder controller 18 which is operatively connected to a flow control means, such as motor valve 19, positioned in reactor off gas line 21. The pressure recorder controller is given an index setting corresponding to the pressure which it is desired to maintain within the reactor. This instrument then operates to control the operation of motor valve 19 so that off gas, principally ethylene, flowing through line 21 is withdrawn at a rate such that a pressure corresponding to the index setting is maintained in the reactor.

The reactor effluent which is withdrawn from the reactor through line 22 comprises a mixture of solid polymer particles containing catalyst, normal pentane, and small amounts of unreacted ethylene. As shown in the drawing, effluent outlet line 22 is preferably sloped downwardly in order to facilitate the flow of material in the line. Since the reaction is carried out at a temperature such that the polymer produced is substantially insoluble in the normal pentane, only a small amount of light polymer will be dissolved in the reaction medium. As discussed hereinbefore, the invention in one of its aspects, resides in an improved means for withdrawing a slurry of solid material in a liquid medium from a pressurized reactor. It has been found that a conventional ported-type motor valve cannot be utilized to control the withdrawal of this type of material because, as a result of the throttling action of such a valve, solids collect on its upstream side, causing the valve to become plugged.

In accordance with the present invention, at least one constriction means 23 is positioned in effluent outlet line 22. As shown in FIGURE 1, the constriction means comprises a series of half venturis disposed in line 22, so that the converging portion of each venturi points in a downstream direction of flow. It is usually preferred to use half venturis because they are not subject to plugging with polymer particles while making it possible to obtain a desired pressure drop. However, it is to be understood that other types of constriction means can be utilized in the practice of this invention as long as the desired pressure drop is provided by the particular arrangement of apparatus. For example, it is within the scope of the invention to utilize an ordinary venturi which comprises a converging and a diverging section or an arrangement which includes a series of such venturis. Furthermore, a conventional orifice can be positioned in line 22 in order to provide for the desired pressure drop. However, this particular type of construction is not preferred because of the tendency of polymer particles to collect around the opening of the orifice, which after continued operation may result in the plugging of the opening. The number of half venturis utilized and the size of the small or downstream opening of each individual half venturi will depend upon the pressure it is desired to maintain within flash chamber 24. It is usually preferred to employ at least three half venturis in series since this permits the utilization of individual half venturis having larger downstream openings than would be permissible if a lesser number were to be used. It is desired that each of the half venturis have an opening therethrough of sufficient diameter so that there is no tendency for the polymer particles to accumulate around the openings. In the usual operation of the type described, a half venturi having a throat opening of 3/16 inch has been found to be satisfactory. The selection of a suitable number of half venturis of appropriate size can be readily made by one skilled in the art by suitable calculations or merely by trial and error. In this regard, it is noted that any desired number of half venturis of appropriate size can be readily assembled by bolting or otherwise clamping the individual half venturis together. This assembly can then be positioned in line 22 by securing the two end half venturis to flanges attached to the ends of line 22.

After flowing through constriction means 23, the reactor effluent is passed in flash chamber 24. Any unreacted gas contained in the effluent is taken overhead from flash chamber 24 through line 26 and then passed into separator 27. Since the material flowing through line 26 may contain a small amount of normal pentane, the stream prior to its being passed into separator 27 is cooled in cooler 28 to ensure that the normal pentane is in liquid form. Ethylene, which is taken overhead from separator 27 through line 29, can be recycled, if desired, to line 14 for use in reactor 13. Normal pentane, which is recovered from separator 27 through line 31, can be recycled to line 10 for ultimate use in reactor 13. The pressure maintained in flash chamber 24 is controlled by means of pressure controller 32 which is operatively connected to the flash chamber and to motor valve 33 positioned in line 26. This pressure is ordinarily about atmospheric although, if desired, higher pressures can be used. It is noted also that the pressure maintained in flash chamber 24 through the operation of pressure controller 32 is substantially equal to the pressure in line 22 on the downstream side of constriction means 23. It is seen, therefore, that the index setting given to pressure controller 32 is a factor in determining the pressure drop across the constriction means.

An important aspect of the instant invention is concerned with controlling the rate at which reaction material is withdrawn from reactor 13. This control is accomplished through the utilization of recycle line 36 in conjunction with the constriction means. Recycle line 36 is connected to flash chamber 24 below the level of liquid material therein and to effluent outlet line 22 at a point between reactor 13 and constriction means 23. Recycle line 36 is provided with a pump, such as positive displacement pump 37, which functions to withdraw a constant amount of liquid material, which is primarily diluent, from flash chamber 24. The amount of liquid material actually returned to effluent outlet line 22 through recycle line 36 is dependent upon the amount of liquid which flows through bypass line 38 which is connected to recycle line 36 on either side of pump 37. Positioned in bypass line 38 is a flow control means, such as motor valve 39, which is operatively connected to a liquid level controller 41. The liquid level controller, which is further operatively connected to reactor 13, operates so as to maintain a desired level of reactant material in reactor 13 by controlling the setting of motor valve 39. It is seen that the amount of liquid material permitted to pass through bypass line 38 has a direct relation on the amount of liquid material returned to outlet conduit 22 through recycle line 36 and concomitantly on the amount of reaction mixture withdrawn from the reactor. Thus, the greater the amount of liquid material entering line 22 through recycle line 36, the less the amount of effluent which is withdrawn from the reactor. For example, if the level in reactor 13 drops below the level which it is desired to maintain therein, liquid level controller 41 operates to cut back on the opening of motor valve 39. As a result, the amount of liquid material flowing in bypass line 38 is decreased while the amount of material entering effluent outlet line 22 through recycle line 36 is increased. Because of the supplying of an increased quantity of liquid material to line 22 through the recycle line, the amount of effluent removed from the reactor through line 22 is decreased, thereby causing the level in the reactor to be raised to the level which it is desired to maintain therein. When the level of reactant materials in the reactor increases above the level to be maintained by the liquid level controller, the converse of the above-described sequence of steps occurs. In other words, the liquid level controller operates so as to increase the opening of motor valve 39, thereby permitting additional material to flow through the bypass line and decreasing the amount of material entering effluent outlet line 22 through line 36. This results in an increase in the amount of material withdrawn from the reactor, thereby lowering the level of reactant materials in the reactor. From the foregoing, it is seen that the combination of the constriction means in the product removal conduit and the liquid recycle means provides an arrangement of apparatus which effectively controls the rate of product withdrawal from a pressurized vessel while maintaining a desired pressure within that vessel.

The particles of polymer which settle in the bottom of flash chamber 24, are removed from this vessel by any suitable means such as a conveyor 43. The polymer particles containing some diluent are thereafter recovered from the conveyor through line 44 and then passed to a suitable drier. A desired liquid level is maintained in the flash chamber by means of liquid level controller 46 which is operatively connected to the flash chamber and to a motor valve 47 positioned in outlet line 48. Through the operation of the liquid level controller, which adjusts the setting of motor valve 47, an amount of diluent necessary to maintain a desired level in the flash chamber is withdrawn through line 48. This diluent can thereafter be recycled to line 10 for subsequent use in reactor 13.

Referring now to FIGURE 2 of the drawing, there is illustrated another embodiment of the present invention. Identical reference numerals have been utilized to designate elements previously described in conjunction with FIGURE 1 of the drawing. The apparatus depicted in FIGURE 2 differs from that shown in FIGURE 1 primarily in the system used to control the rate of product withdrawal from reactor 13. A pressure recorder controller 51 is operatively connected to reactor 13, which in this embodiment is liquid full during the conduct of the process. Air line 52 from pressure recorder 51 contains a 3-way valve 53, and air line 54 is connected to one of the openings of the 3-way valve and to motor valve 56 positioned in recycle line 36. The other opening of the 3-way valve has an air line 57 connected thereto, this line being further connected to a transducer 58. The transducer functions to change the air signal supplied by pressure recorder controller 51 through lines 52 and 57 to an electrical signal which is thereafter fed to speed controller 59. The speed controller operates to control the speed of motor 61 in accordance with the signal supplied by pressure recorder controller 51, while the motor itself acts as the prime mover for pump 62.

Assuming that 3-way valve 53 is adjusted so that an air signal is supplied to motor valve 56 through air lines 52 and 54, motor 61 now operates pump 62, which can conveniently be a centrifugal pump, at a constant speed. It is to be understood that in this type of operation there is no flow of air through line 57 and no electrical signal is supplied to speed controller 59. The pressure recorder controller is given an index setting corresponding to the pressure which it is desired to maintain in reactor 13, and through the operation of this instrument the rate of product withdrawal is controlled so as to maintain this desired pressure. For example, if the pressure increases above the index setting given the pressure recorder controller, a signal is supplied to motor valve 56 which functions to decrease the opening of this valve. As a result, less liquid material is pumped from flash tank 24 through recycle line 36 to effluent outlet conduit 22. The rate at which material is now withdrawn from the reactor is thereby increased until such time as the pressure in the reactor returns to the desired level. When the pressure in reactor 13 decreases below the index setting given the pressure recorder controller, the converse of the above-described sequence of steps occurs. That is, motor valve 56 is adjusted so that a larger amount of liquid material is recycled to effluent outlet conduit 22, thereby cutting back on the amount of reactant material removed from the reactor.

It is to be noted that feed inlet line 14 includes a motor valve 63 which is also operatively connected to pressure recorder controller 51. Motor valve 63 operates so that the supply of ethylene to the reactor can be reduced, if desired, when the pressure in the reactor reaches a desired value. Thus, when the pressure in reactor 13 increases above the index setting given to pressure recorder controller 51, the signal supplied by this instrument causes valve 63 to reduce the supply of ethylene to the reactor. When the pressure in the reactor decreases below the index setting on the pressure recorder controller, the motor valve remains open so that the full amount of ethylene continues to be charged to the reactor. It is seen that the motor valve 63 operates in conjunction with the control devices in line 36 to hasten the return of the reactor pressure to the desired value.

When 3-way valve 53 is adjusted so that air enters line 57 rather than line 54, motor valve 56 then remains completely open. The output air signal from pressure recorder controller 51 is now supplied to transducer 58 which converts the air signal into an electrical signal. This electrical signal is then supplied to speed controller 59 which functions to control the speed of motor 61. Since motor 61 is connected to pump 62, the pump is operated at a speed proportional to the signal supplied by pressure recorder controller 51. It is thus seen that the amount of liquid material recycled through line 36 by the operation of pump 62 is dependent upon the pressure to be maintained within reactor 13. For example, if the pressure within reactor 13 increases above the desired pressure setting given the pressure recorder controller, the signal supplied by the controller functions to decrease the speed of motor 61. As a result, pump 62 pumps less material from flash chamber 24 through line 36 which permits a greater amount of material to be removed from the reactor through line 22 and thereby decrease the pressure in the reactor. This operation continues until such time as the pressure in reactor 13 returns to the value given the pressure recorder controller. When the pressure in reactor 13 falls below the setting given the pressure recorder controller, the speed of pump 62 increased so that more material is returned through recycle line 36 to line 22. As a result, less material is removed from the reactor through line 22, thereby permitting the pressure therein to increase to the desired pressure corresponding to the setting given to the pressure recorder controller 51.

The liquid material recycled through line 36 is primarily normal pentane although it can contain a small amount of dissolved ethylene and a few small particles of polymer. Substantially all of the polymer settles into the bottom of the flash chamber from which it is withdrawn through line 66 as a slurry of polymer in normal pentane. The slurry is withdrawn from the flash chamber at a rate sufficient to maintain a desired liquid level in the flash chamber. This control is accomplished by means of liquid level controller 67 which is operatively connected to the flash chamber and to rotary valve 68 in line 66 through transducer 69 and speed controller 70. The air signal furnished by controller 67 is converted into an electrical signal by transducer 69, the electrical signal then being supplied to speed controller 70. The speed controller functions to control the speed of a motor associated with rotary valve 68. The catalyst slurry can thereafter be treated by any suitable method in order to effect the removal of the catalyst particles from the slurry. This separation can be advantageously accomplished by utilizing steam to strip the normal pentane from the polymer which is thereafter dried in a suitable drier.

As mentioned hereinbefore, in carrying out the process of this invention in the apparatus shown in FIGURE 2, the reactor is operated liquid full. It is to be understood, however, that the reactor can be operated with the reactant material maintained at a desired level in the reactor by the utilization of a liquid level controller as shown in FIGURE 1. In such an operation, a liquid level controller instead of a pressure recorder controller supplies an air signal to 3-way valve 53 of FIGURE 2. The pressure recorder controller then functions as in FIGURE 1 to adjust a motor valve in an off gas line so as to maintain a desired pressure in the reactor. When using this arrangement of apparatus, it is unnecessary to provide a motor valve in the monomer inlet line as shown in FIGURE 2.

Polymers produced in accordance with the above-described process have utility in applications where solid plastics are used. They can be molded to form a variety of articles of any desired shape such as bottles and other containers for liquid. Also, they can be formed into pipe or tubing by extrusion methods.

A more complete understanding of the invention can be obtained by referring to the following illustrative example which is not intended, however, to be unduly limitative of the invention.

EXAMPLE

Apparatus similar to that illustrated in FIGURE 2 of the drawing is used to polymerize ethylene. In this particular experiment, however, a liquid level controller operatively connected to the reactor is utilized to control the operation of the motor valve in the recycle line rather than a pressure recorder controller as shown in FIGURE 2. The reactor, which has a capacity of 1700 gallons, is jacketed and is provided with a mechanical stirrer. The catalyst used is prepared by the impregnation of a 20 to 50 micron silica-alumina coprecipitated composite with an 0.76 molar chromium trioxide solution. The silica-alumina composite comprises 90 weight percent silica and 10 weight percent alumina. The resulting composite is dried and activated with dry air for five hours at 950° F. The final catalyst contains 2.0 weight percent chromium oxide calculated as chromium.

The polymerization is carried out at a temperature of about 210° F., using normal pentane as the solvent. A pressure recorder controller operatively connected to the motor valve in the off gas line operates to maintain a reactor pressure of about 400 p.s.i.a. The liquid level controller operates the motor valve positioned in the recycle line so as to maintain a desired level of reactant material in the reactor. In this manner, the rate at which product is withdrawn from the reactor is effectively controlled. Three half venturis are positioned in the effluent outlet line extending between the reactor and the flash chamber. The effluent outlet line is a one-half inch pipe, and the three half venturis each have a throat diameter of 3/16 inch. This arrangement of apparatus results in a pressure drop of about 200 p.s.i. across the half venturis. A pressure of about 200 p.s.i.a. is maintained in the flash chamber by withdrawing a gas stream comprising principally ethylene from the chamber at a controlled rate. A product stream containing solid polymer in particle form is recovered from the bottom of the flash chamber.

The results of this experiment are set forth hereinbelow in the table in which the numerals in parentheses refer to the reference numerals of the various lines shown in FIGURE 2. The flow rates shown in the table are expressed in pounds per day of the listed materials.

*Table*

|  | (10) Diluent | (14) Feed | (22) Reactor Effluent | (26) Flash Chamber Overhead | (66) Flash Chamber Bottoms | (36) Recycle |
|---|---|---|---|---|---|---|
| Methane | 42 | 4.5 | 46.5 | 40.5 | 6 | 4.5 |
| Ethane | 80 | 8.5 | 88.5 | 59 | 29.5 | 23 |
| Ethylene | 2,613 | 4,343 | 2,885 | 2,060 | 825 | 643 |
| Pentane | 36,200 |  | 36,200 | 4,860 | 31,340 | 24,300 |
| Soluble Polymer | 374 |  | 414 |  | 414 | 322 |
| Polymer |  |  | 4,031 |  | 4,031 |  |
| Catalyst | 4 |  | 4 |  | 4 |  |
| Total | 39,313 | 4,356 | 43,669 | 7,019.5 | 36,649.5 | 25,292.5 |

From the foregoing, it is seen that an improved means is provided whereby a slurry of solids in a liquid material can be removed from a pressurized vessel at a controlled rate. Also, the problem of valve erosion, which is a disadvantage of conventional systems utilizing a valve to control the rate of product withdrawal, is not present in the apparatus of this invention. It will be apparent to those skilled in the art that variations and modifications can be made in the light of the foregoing disclosure. Such variations and modifications are believed to be clearly within the spirit and scope of the invention.

I claim:

1. In apparatus comprising a pressure vessel having one end of an inlet conduit means and one end of an outlet conduit means attached thereto, the improvement which comprises an enclosed vessel having the other end of said outlet conduit means attached thereto; a fixed constriction means positioned in said outlet conduit means between said pressure vessel and said enclosed vessel; a recycle conduit means connecting said enclosed vessel to said outlet conduit means at a point between said pressure vessel and said constriction means; means responsive to liquid level in said pressure vessel for controlling the rate of flow of material in said recycle conduit means; gas outlet means attached to an upper portion of said enclosed vessel; and means for withdrawing material from a lower portion of said enclosed vessel.

2. The apparatus according to claim 1 in which said constriction means comprises at least one half venturi.

3. The apparatus according to claim 1 in which said constriction means comprises an orifice.

4. The apparatus according to claim 1 in which said constriction means comprises a venturi.

5. In apparatus comprising a pressure vessel having one end of an inlet conduit means and one end of an outlet conduit means attached thereto, the improvement which comprises an enclosed vessel having the other end of said outlet conduit means attached thereto; a fixed constriction means positioned in said outlet conduit means between said pressure vessel and said enclosed vessel; a recycle conduit means connecting said enclosed vessel to said recycle conduit means at a point between said pressure vessel and said constriction means; a pumping means positioned in said recycle conduit means; a bypass conduit means attached to said recycle conduit means on either side of said pumping means; a flow control means positioned in said bypass conduit means; a liquid level control means operatively connected to said pressure vessel and to said flow control means; gas outlet means attached to an upper portion of said enclosed vessel; and means for withdrawing material from a lower portion of said enclosed vessel.

6. The apparatus according to claim 5 in which a flow control means is positioned in said gas outlet means; a pressure control means is operatively connected to said enclosed vessel and to said flow control means; an outlet conduit means is attached to an intermediate portion of said enclosed vessel; a flow control means is positioned in said outlet conduit means; and a liquid level control means is operatively connected to said enclosed vessel and to said last-mentioned flow control means.

7. In apparatus comprising a pressure vessel having one end of an inlet conduit means and one end of an outlet conduit means attached thereto, the improvement which comprises an enclosed vessel having the other end of said outlet conduit means attached thereto; a fixed constriction means positioned in said outlet conduit means between said pressure vessel and said enclosed vessel; a recycle conduit means connecting said enclosed vessel to said outlet conduit means at a point between said pressure vessel and said constriction means; a pumping means positioned in said recycle conduit means; a flow control means positioned in said recycle conduit means between said pumping means and the point of connection of said recycle conduit means to said outlet conduit means; a pressure control means operatively connected to said pressure vessel and to said flow control means; and means for withdrawing material from a lower portion of said enclosed vessel.

8. The apparatus according to claim 7 in which a flow control means is positioned in said gas outlet means; a pressure control means is operatively connected to said enclosed vessel and to said flow control means; said material withdrawal means is a conduit means; a flow control means is positioned in said conduit means; and a liquid level control means is operatively connected to said pressure vessel and to last-mentioned flow control means.

9. The apparatus according claim 7 in which a flow control means is positioned in said inlet conduit means attached to said pressure vessel; and said flow control means is operatively connected to said pressure control means.

10. In apparatus comprising a pressure vessel having one end of an inlet conduit means and one end of an outlet conduit means attached thereto, the improvement which comprises an enclosed vessel having the other end of said outlet conduit means attached thereto; a fixed constriction means positioned in said outlet conduit means between said pressure vessel and said enclosed vessel; a recycle conduit mean connecting said enclosed vessel to said outlet conduit means at a point between said pressure vessel and said constriction means; a pumping means positioned in said recycle conduit means; a pressure control means operatively connected to said pressure vessel and to said pumping means; gas outlet means attached to an upper portion of said enclosed vessel; and means for withdrawing material from a lower portion of said enclosed vessel.

11. The apparatus according to claim 10 in which a flow control means is positioned in said inlet conduit means attached to said pressure vessel; and said flow control means is operatively connected to said pressure control means.

12. In a process which is carried out in a closed reaction zone at an elevated pressure, the improvement in recovering liquid material from said reaction zone which comprises withdrawing liquid material from said reaction zone through a transfer zone at said elevated pressure; passing said withdrawn liquid material through a pressure reduction zone associated with said transfer zone so that said liquid material is thereafter at a pressure lower then said elevated pressure; flowing said liquid material at said lower pressure into a flash zone; recycling a portion of said liquid material from said flash zone to said transfer zone at a point upstream from said pressure reduction zone; controlling the rate at which said liquid material is recycled to said transfer zone in response to pressure in said reaction zone so that the recycle rate is decreased when said pressure increases above a desired value and is increased when said pressure decreases below a desired value; and withdrawing another portion of said liquid material from said flash zone.

13. In a process which is carried out in a closed reaction zone at an elevated pressure, the improvement in recovering from said reaction zone a slurry of solids in a liquid material which comprises withdrawing said slurry from said reaction zone through a transfer zone at said elevated pressure; passing said withdrawn slurry through a pressure reduction zone associated with said transfer zone so that said slurry is thereafter at a pressure lower than said elevated pressure; flowing said slurry at said lower pressure into a flash zone; recycling liquid material from said flash zone to said transfer zone at a point upstream from said pressure reduction zone; measuring the level of liquid in said reaction zone; controlling the rate at which said liquid material is recycled to said transfer zone in response to said liquid level measurement so that the recycle rate is decreased when said liquid level measurement increased above a desired value and is increased when said liquid level measurement decreases below a desired value; withdrawing gas from an upper portion of said flash zone; and withdrawing a stream comprising solids from said flash zone.

14. In a process which is carried out in a closed reaction zone at an elevated pressure, the improvement in recovering from said reaction zone a slurry of solids in a liquid material which comprises withdrawing said slurry from said reaction zone through a transfer zone at said elevated pressure; passing said withdrawn slurry through a pressure reduction zone associated with said transfer zone so that said slurry is thereafter at a pressure lower than said elevated pressure; flowing said slurry at said pressure into a flash zone; recycling liquid material from said flash zone to said transfer zone at a point upstream from said pressure reduction zone; measuring the pressure in said reaction zone; controlling the rate at which said liquid material is recycled to said transfer zone in response to said pressure measurement so that the recycle rate is decreased when said pressure measurement increased above a desired value and is increased when said pressure measurement decreases below a desired value; withdrawing gas from an upper portion of said flash zone; and withdrawing a stream comprising solids from said flash zone.

15. In apparatus comprising a pressure vessel having one end of an inlet conduit means and one end of an outlet conduit means attached thereto, the improvement which comprises an enclosed vessel having the other end of said outlet conduit means attached thereto; a fixed constriction means positioned in said outlet conduit means between said pressure vessel and said enclosed vessel; a recycle conduit mean connecting said enclosed vessel to said outlet conduit means at a point between said pressure vessel and said construction means; means responsive to pressure in said pressure vessel for controlling the rate of flow of material in said recycle conduit means; gas outlet means attached to an upper portion of said enclosed vessel; and means for withdrawing material from a lower portion of said enclosed vessel.

16. In a process which is carried out in a closed reaction zone at an elevated pressure, the improvement in recovering liquid material from said reaction zone which comprises withdrawing liquid material from said reaction zone through a transfer zone at said elevated pressure; passing said withdrawn liquid material through a pressure reduction zone associated with said transfer zone so that said liquid material is thereafter at a pressure lower than said elevated pressure; flowing said liquid material at said lower pressure into a flash zone; recycling a portion of said liquid material from said flash zone to said transfer zone at a point upstream from said pressure reduction zone; controlling the rate at which said liquid material is recycled to said transfer zone in response to liquid level in said reaction zone so that the recycle rate is decreased when said liquid level increases above a desired value and is increased when said liquid level decreases below a desired value; and withdrawing another portion of said liquid material from said flash zone.

References Cited in the file of this patent

UNITED STATES PATENTS 2,691,647    Field et al.    Oct. 12, 1954
2,862,917    Anderson et al.    Dec. 2, 1958

UNITED STATES PATENT OFFICE
CERTIFICATE OF CORRECTION

Patent No. 3,001,978                          September 26, 1961

Norman F. McLeod

It is hereby certified that error appears in the above numbered patent requiring correction and that the said Letters Patent should read as corrected below.

Column 12, line 18, after "said", third occurrence, insert -- lower --.

Signed and sealed this 10th day of April 1962.

(SEAL)
Attest:

ERNEST W. SWIDER
Attesting Officer

DAVID L. LADD
Commissioner of Patents